United States Patent [19]

Miura et al.

[11] Patent Number: 4,677,850

[45] Date of Patent: Jul. 7, 1987

[54] SEMICONDUCTOR-TYPE FLOW RATE DETECTING APPARATUS

[75] Inventors: Kazuhiko Miura, Kaichi; Tadashi Hattori; Yukio Iwasaki, both of Okazaki; Tokio Kohama, Nishio; Kenji Kanehara, Aichi, all of Japan

[73] Assignee: Nippon Soken, Inc., Nishio, Japan

[21] Appl. No.: 843,922

[22] Filed: Mar. 21, 1986

Related U.S. Application Data

[63] Continuation of Ser. No. 579,075, Feb. 10, 1984, abandoned.

[30] Foreign Application Priority Data

Feb. 11, 1983 [JP] Japan ................................. 58-20842
May 10, 1983 [JP] Japan ................................. 58-82418
Jun. 20, 1983 [JP] Japan ................................. 58-110398
Jun. 23, 1983 [JP] Japan ................................. 58-113977

[51] Int. Cl.$^4$ .............................................. G01F 1/68
[52] U.S. Cl. .............................................. 73/204
[58] Field of Search ........................... 73/204; 374/178

[56] References Cited

U.S. PATENT DOCUMENTS

| | | | |
|---|---|---|---|
| 3,881,181 | 4/1975 | Khajezadeh | 338/22 |
| 3,942,378 | 3/1976 | Olmstead | 73/204 |
| 3,988,928 | 11/1976 | Edstrom et al. | 73/204 |
| 3,992,940 | 11/1976 | Platzer, Jr. | 73/204 |
| 3,996,799 | 12/1976 | van Putten | 73/204 |
| 4,089,214 | 5/1978 | Egami et al. | 73/204 |
| 4,283,944 | 8/1981 | Gruner et al. | 73/204 |
| 4,425,792 | 1/1984 | Kohama et al. | 73/204 |
| 4,433,576 | 2/1984 | Shih et al. | |
| 4,478,077 | 10/1984 | Bohrer et al. | 73/204 |

OTHER PUBLICATIONS

Huijsing et al., "Monolithic Integrated Direction-Sensitive Flow Sensor" IEEE Trans. on Electronic Devices ED-29, #1, 1/82, pp. 133-136.
Huijsing et al., "Integrated Direction-Sensitive Flowmeter" in Electronics Letter, vol. 12, #24, 1/25/76, pp. 647-648.

*Primary Examiner*—Herbert Goldstein
*Attorney, Agent, or Firm*—Cushman, Darby & Cushman

[57] ABSTRACT

In a semiconductor-type flow rate detecting apparatus, a casing arranged in the fluid path includes first and second semiconductor chips. The first semiconductor chip has a first temperature detector. The second semiconductor chip arranged in proximity to the first semiconductor chip has a heater and a second temperature detector.

15 Claims, 19 Drawing Figures

SEMICONDUCTOR-TYPE FLOW RATE DETECTING APPARATUS

This is a continuation of application Ser. No. 579,075, filed Feb. 10, 1984, which was abandoned upon the filing hereof.

RELATED APPLICATIONS

The subject matter of this application is generally related to the subject matter of the U.S. application of Miura, Ser. No. 690,254 filed on Jan. 10, 1985.

BACKGROUND OF THE INVENTION

The present invention relates to a semiconductor-type flow rate detecting apparatus useful for metering the flow rate of intake air of an engine.

Conventional flow meters using a platinum resistance wire such as a Thomas meter and a hot-wire type flow meter are well known. The disadvantages of these flow meters are that the metering element exposed to fluid is made up of a wire and therefore is easily broken by a vibration or a shock.

Another conventional flow meter is of such a construction that a film of resistor is deposited by evaporation or printed on an insulator such as a ceramic substrate. This flow meter has a metering element in film form resistant to vibrations. Since the resistor film is formed by evaporation or printing, however, the metering element cannot be finely processed and therefore is required to be formed in large size, resulting in an increased heat capacity for a deteriorated response characteristic.

SUMMARY OF THE INVENTION

The object of the present invention is to provide a flow-rate detecting apparatus high in resistance to vibrations and response, which obviates the above-mentioned disadvantages of the conventional flow meters.

According to the present invention, there is provided a semiconductor-type flow rate detecting apparatus comprising a first semiconductor chip formed with a temperature detector, a second semiconductor chip formed with a heater and a temperature detector, and means for supporting the first and second semiconductor chips in proximity to a casing.

DESCRIPTION OF THE PREFERRED EMBODIMENTS

Figure 1:
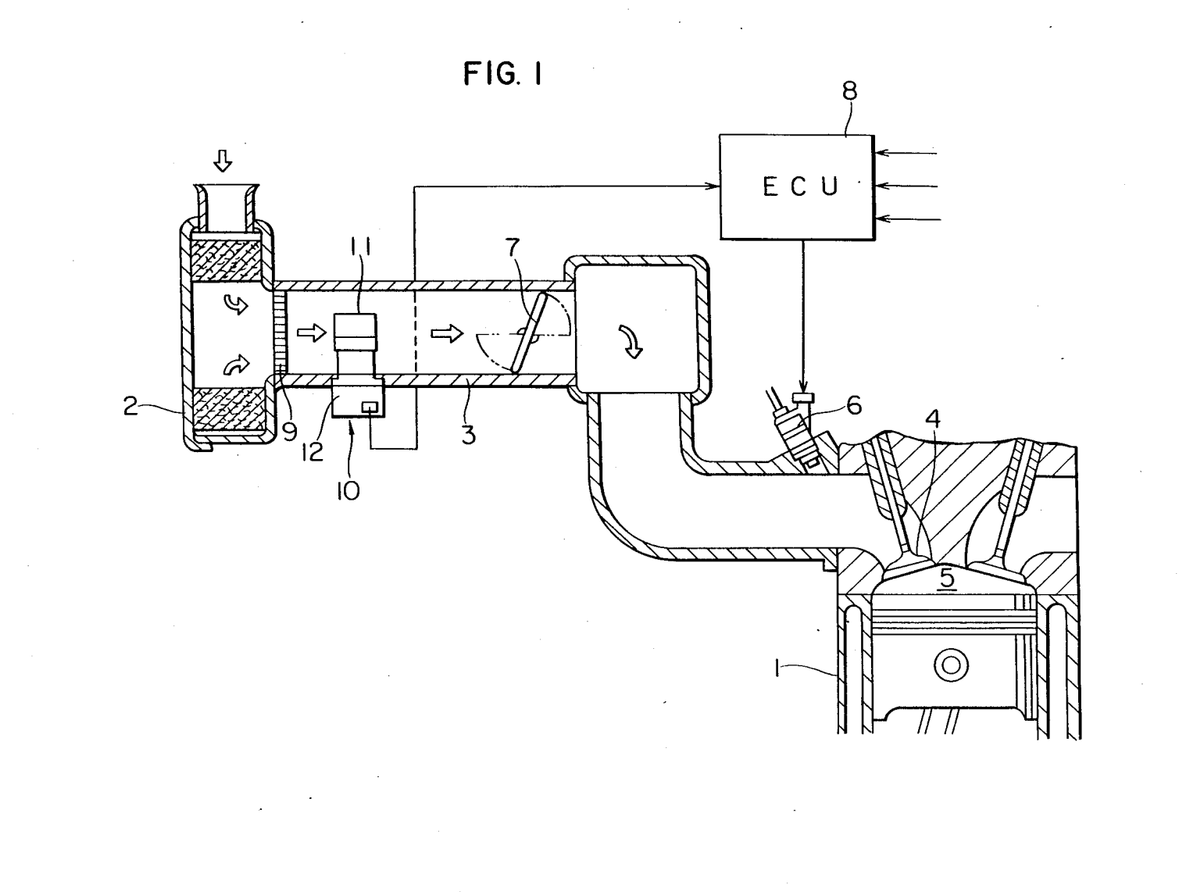
FIG. 1 is a diagram showing a construction of an engine comprising an apparatus according to the present invention.

An example of a spark ignition engine of fuel injection type comprising a semiconductor-type flow rate detecting apparatus according to the present invention is shown in FIG. 1. The combustion air is taken into a combustion chamber 5 of an engine 1 through an air cleaner 2 and an intake pipe 3 when an intake air valve 4 opens. The fuel is supplied by injection from an electromagnetic fuel injection valve 6 mounted on the intake pipe 3. The amount of air thus taken in is controlled by the operation of a throttle valve 7 arranged in the intake pipe 3. On the other hand, the amount of fuel injected is controlled to an amount basically commensurate with the intake air amount, or to such an amount as corrected, when required, by changing the open time of the injection valve through an electronic control unit 8.

A rectifier grid 9 is installed directly downstream of the air cleaner 2. This grid 9 has a function to rectify the flow of the intake air to improve the accuracy of flow rate measurement of the flow rate detecting apparatus.

In this intake system of the engine 1, a semiconductor-type flow rate detecting apparatus 10 is mounted on the intake pipe 3 between the throttle valve 7 and the rectifier grid 9. The detecting apparatus 10, which measures the intake air flow rate of the engine 1 and applies a corresponding electrical signal to the control unit 8, comprises a sensor section 11 and a circuit section 12, the sensor section 11 being arranged in the intake pipe 3.

Figure 2:
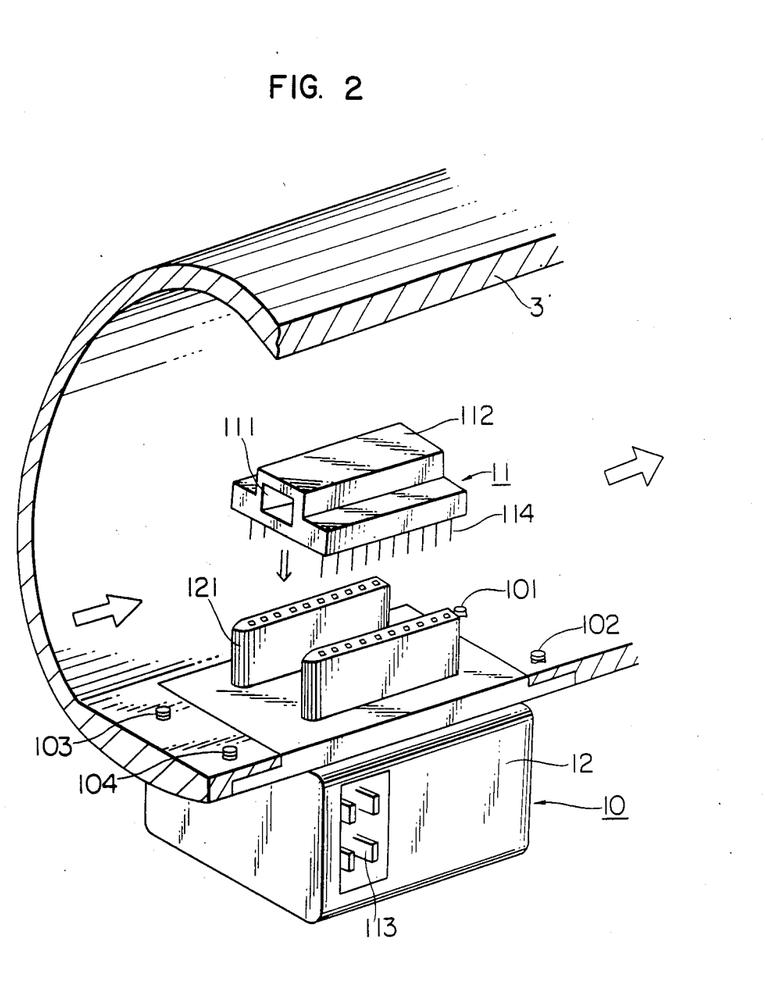
FIG. 2 is a perspective sectional view of the essential parts of the apparatus illustrated in FIG. 1.

Now, the detecting apparatus 10 will be described with reference to FIG. 2 showing the manner in which the apparatus 10 is mounted on the intake pipe 3. The semiconductor-type flow rate detecting apparatus 10 comprising the sensor section 11 and the circuit section 12 is secured to the intake pipe 3 with screws 101 to 104.

The sensor section 11 includes a fluid path 111 in parallel to the fluid flow in a housing, and a pair of semiconductor chips arranged at the central position thereof for detecting the flow rate. The sensor section 11 also includes a casing 112 of dual in-line package type having two rows of pins 114. After evaluation and selection of a sensor 11 by an IC tester or the like, the two rows of pins 114 for producing a signal of the semiconductor chips are inserted into a pair of sockets 121 and are bonded securely in a manner not to loosen under vibrations or the like.

The circuit section 12 is adapted to process the output signal of the semiconductor chips and produce a signal representing the flow rate by way of a connector 113.

The sockets 121 are protruded into the intake pipe 3 at a position representing the flow rate in the intake pipe 3 where the flow of air along the path 111 of the sensor 11 is not affected by the wall boundary of the intake pipe 3. Also, in order to prevent the air flow from becoming turbulent to increase the pressure loss, each forward end of the sockets 121 along the flow is shaped in sharp angle.

Figure 3:
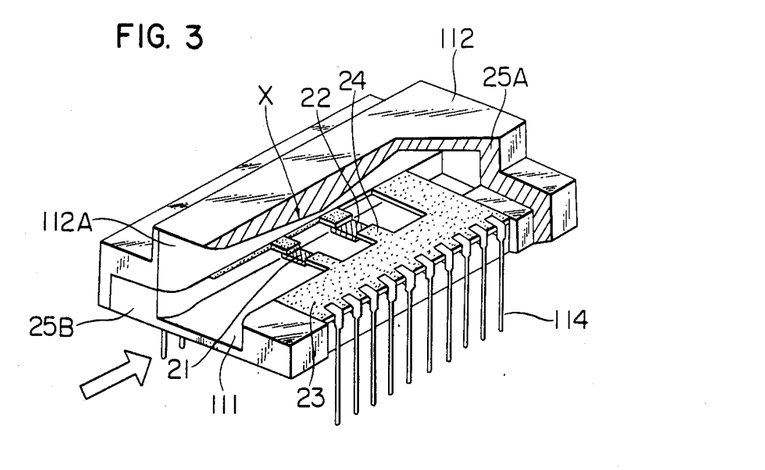
FIG. 3 is a partly out-away sectional perspective view of a sensor of the apparatus shown in FIG. 2.

In FIG. 3 showing a construction of the sensor 11, reference numeral 21 designates a first semiconductor chip arranged on the upstream side and including a temperature detector on a silicon substrate, and numeral 22 a second semiconductor chip arranged proximate the first semiconductor chip 21 on the downstream side and including a heater and a temperature detector on a silicon substrate.

Numeral 23 designates a ceramic substrate on which a conductor paste is baked by printing to electrically connect lead pins 114 to the chips 21, 22, the lead pins 114 and the chips 21, 22 being soldered to each other by the flip chip bump method.

The substrate 23 includes a cut-out portion thereof formed with four protruded supports 24, on which the chips 21 and 22 are arranged to be exposed to the air flow. In this way, only that part of the ceramic substrate 23 which is fixed with the semiconductor chips and required for taking out a signal is positioned in the fluid path 11 so that the amount of heat of the heater of the second semiconductor chip 22 and the amount of heat transmitted from the ceramic substrate to the fluid are reduced thereby to reduce the power consumption of the heater. The substrate 23 is housed and supported in a casing 112 made of PPS, which in turn includes a protruded upper casing part 25A and a recessed lower casing part 25B.

The fluid inlet 112A of the casing 112 is bellmouth-shaped to admit the flow of the fluid into the path 111 without any turbulence.

Further, in order for the flow of fluid to the second semiconductor chip 22 not to stagnate at the boundary formed by the effect of the first semiconductor chip 21, the internal surface X (upper part of the path 111) of the upper housing part 25A is so constructed as to protrude toward the semiconductor chips in a manner for the flow of fluid to be applied to the chip 22 diagonally. By this construction, the flow rate may be detected with high accuracy while the downstream chip 22 is not affected by the upstream chip 21.

Figure 4:
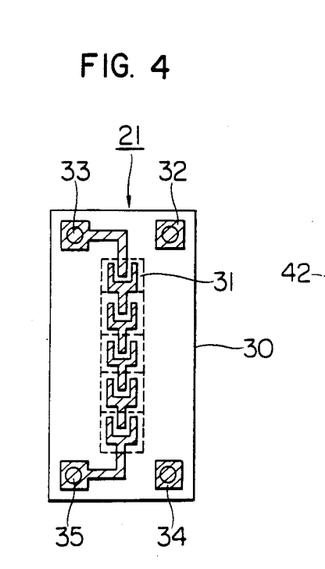
FIG. 4 is a plan view of a first semiconductor chip.

The construction of the semiconductor chips 21 and 22 will be explained. The temperature detector of the semiconductor may be one of two types; one including a diode or a transistor for temperature detection taking advantage of the linear characteristics of the diode or transistor, as the case may be, having the forward voltage of 2.0 to 2.5 mV against unit temperature in °C., and the other utilizing the fact that the resistance value of a diffusion resistor formed by the diffusion process changes with temperature. In the embodiment under consideration, a diode is used to make up a temperature detector. In FIG. 4 showing the upstream semiconductor chip 21, the shadowed part represents an aluminum electrode. Numeral 31 designates a temperature detector including five diodes formed by diffusion of N-type impurities and P-type impurities followed by deposition by evaporation of an aluminum electrode in a silicon substrate 30, the five diodes being connected in series to attain a high sensitivity with the temperature characteristic of 10 to 12.5 mV/°C.

Numerals 32 to 35 designate flip chip bumps formed by soldering which are fixed by contact at four points with the ceramic substrate 23. The chip-fixing method by the flip chip bump process involves four point contacts, and therefore can reduce the heat capacity of the chip as compared with the alloy method generally used for semiconductors.

Figure 5:
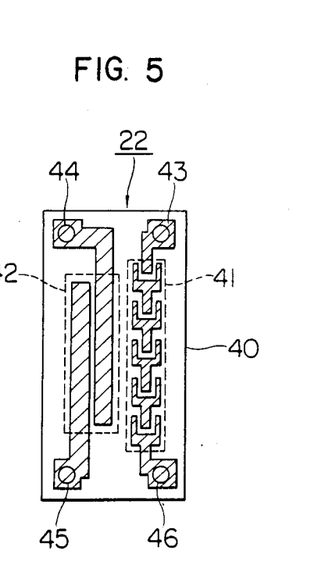
FIG. 5 is a plan view showing a second semiconductor chip.

In FIG. 5 showing the downstream semiconductor chip 22, numeral 41 designates a temperature detector including five diodes formed on the silicon substrate 40 in the same manner as those for the element 31. Numeral 42 designates a heater including a diffusion resistor. The heater 42, which is formed with a diffusion resistor in the silicon substrate 40, increases the freedom of shape of the heating part. Numerals 43 to 46 designate flip chip bumps.

Figure 6:
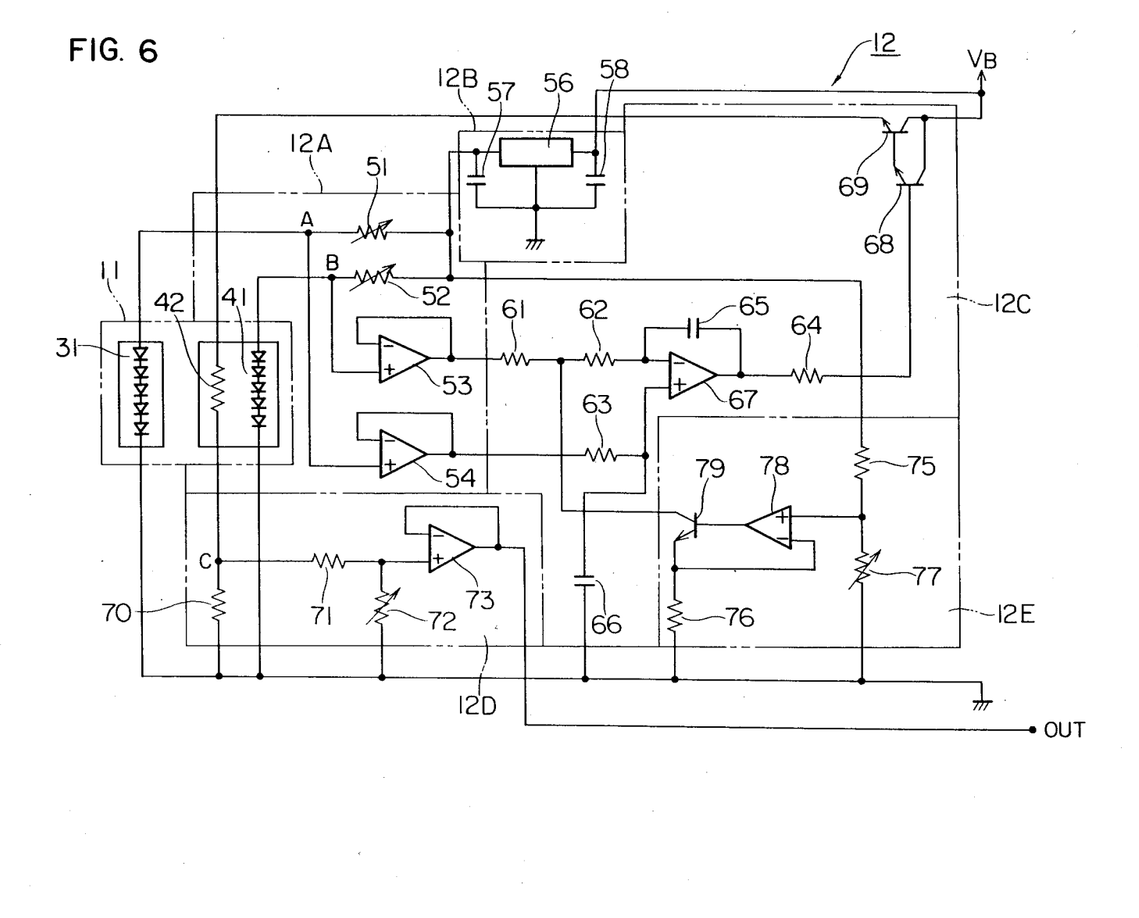
FIG. 6 is a diagram showing an electrical circuit used in the present invention.

Now, the circuit section 12 will be explained in detail with reference to FIG. 6. The circuit section 12 is provided for processing the detection signal of the sensor 11 and producing an output signal representing the flow rate, and includes a buffer circuit 12A, a power circuit 12B, a differential amplifier circuit 12C, an output circuit 12D and an offset circuit 12E.

The buffer circuit 12A includes variable resistors 51, 52 for regulating the variations of the temperature coefficient of the temperature detector elements 31, 41 and operational amplifiers 53, 54 of voltage-follower type for detecting the potential of the elements 31, 41.

The power circuit 12B is provided for generating a stabilized voltage from a battery voltage $V_B$, and includes a regulator 56, and capacitors 57, 58.

The differential amplifier 12C includes resistors 61 to 64, capacitors 65, 66, an operational amplifier 67 and power transistors 68, 69 for differentially amplifying the potential of the diodes 31, 41 dependent on the air temperature and driving the transistors 68, 69 accordingly to control the voltage (current) applied to the heater 42. The capacitor 65 is provided for the purpose of giving a predetermined time constant to the feedback system.

The output circuit 12D includes a current detection resistor 70, a resistor 71, an output level regulating variable resistor 72, and an operational amplifier 73 of voltage follower type for producing a voltage corresponding to the current in the heater 42 from the output terminal OUT.

The offset circuit 12E includes resistors 75, 76, a variable resistor 77, an operational amplifier 78, and a transistor 79 for applying an offset voltage set by the resistors 75 and 77 to the junction point of the resistor 61 and resistor 62. In other words, the voltage applied to the reverse input terminal of the operational amplifier 67 is reduced by the amount of the offset voltage.

In this configuration, when power is consumed by the heater 42 of the second conductor chip 22 on the downstream side, the resulting heat is transmitted to the gas flowing in the path 111 of the casing 112 on the one hand and to the silicon substrate of the second semiconductor chip 22, the ceramic substrate 23 and the first semiconductor chip 21 on the other. As compared with the case in which temperature detectors and the heater are arranged on a single chip using a silicon substrate of high heat conductivity, the two-chip construction has such an advantage that since the heat of the heater 42 is transmitted to the first semiconductor chip 21 via the point contacts formed of the flip chip bumps and the ceramic substrate of low heat conductivity, the temperature detector 31 of the first semiconductor chip 11 on the upstream side approaches the temperature of the gas flow, so that a great temperature difference is obtained between the temperature detectors 31 and 41.

The temperature detectors and the heater, which are solid but not made of a wire, have no problem of breakage and can be finely processed by use of the ordinary semiconductor fabrication techniques, so that the size, that is, the heat capacity of these portions is reduced to improve the responsiveness.

The amount of heat generated by the heater 42 is controlled by the circuit section 12 in such a manner that the potential difference between the points A and B of the diodes 31 and 41 is equal to the offset voltage, thus controlling the temperature difference between the diodes 31 and 41 to a predetermined value. As a result of this control, the power consumed by the heater 42 has a predetermined functional relation with the flow rate and increases along a certain curve with the flow rate. On the other hand, the power consumption of the heater 42 is produced as a voltage at point C, and therefore a signal corresponding to the flow rate is produced from the terminal OUT.

Figure 7:
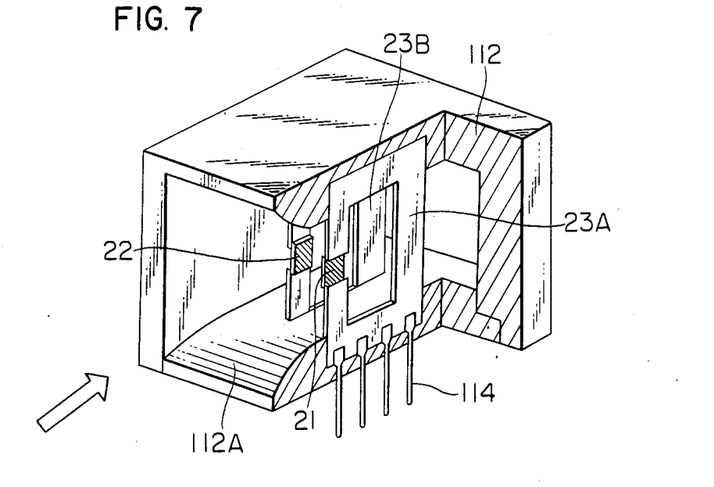
FIG. 7 is a partly cut-away sectional perspective view of a second embodiment of the present invention.

Now, a second embodiment of the present invention will be described with reference to FIG. 7. According to the second embodiment, a pair of ceramic substrates 23A and 23B are prepared and have mounted thereon first and second semiconductor chips 21 and 22 respectively. This construction of double ceramic substrates permits the temperature of the first and second semiconductor chips 21 and 22 to approach closer to the temperature of the fluid flow, thus reducing the power consumption of the heater as compared with that of the first embodiment.

Figure 8:
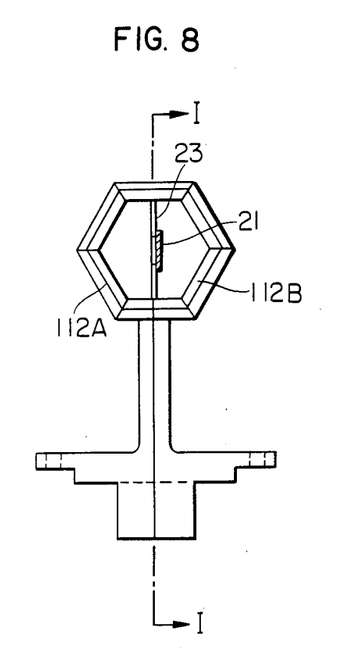
FIG. 8 is a front view showing a third embodiment of the present invention.
Figure 9:
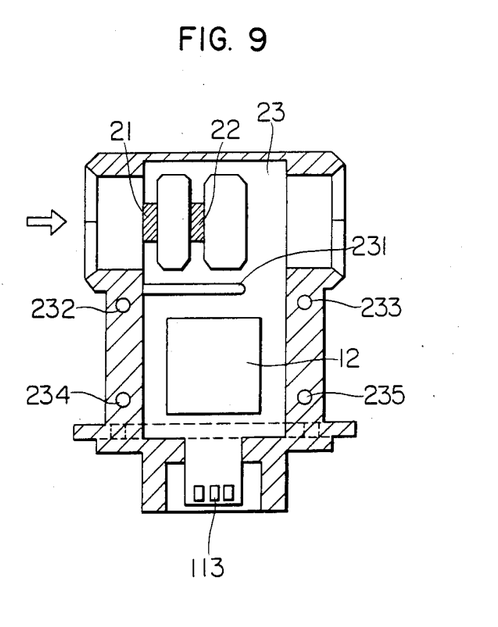
FIG. 9 is a sectional view taken in line I—I in FIG. 8.

FIGS. 8 and 9 show a third embodiment, in which a circuit section of hydrid IC is arranged on a ceramic substrate holding the chips of the sensor thereby to reduce the size of the detector including the circuit section. The ceramic substrate 23 includes a cut-out portion 231 for insulating the circuit section 12 from the first semiconductor chip 21 and the second semiconductor chip 22 mounted on the sensor, and is provided with a connector 113 at the end thereof opposite to the sensor. This ceramic substrate 23 is screwed at holes 232 to 235 with a cushion of rubber or the like between housing parts 112A and 112B made of a metal such as aluminum or a heat-resistant resin.

Figure 10:
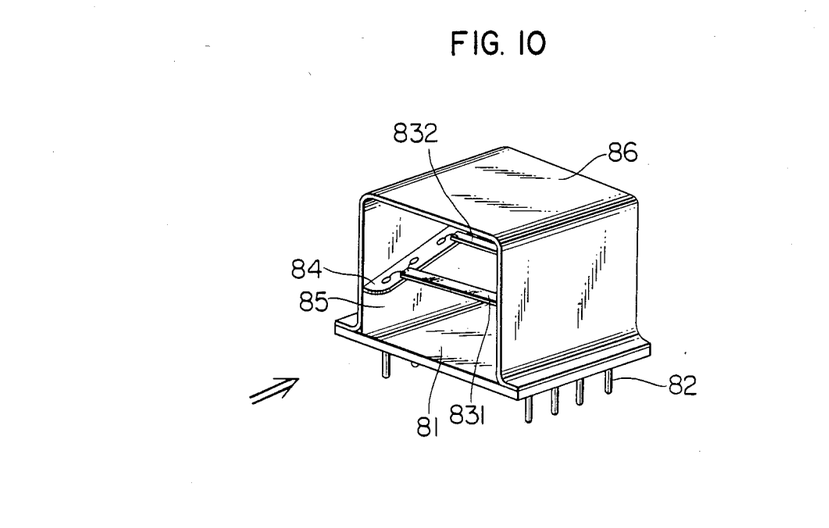
FIG. 10 shows a fourth embodiment of the present invention.

FIG. 10 shows a fourth embodiment of the present invention. A substrate 81 is constructed hermetically integrally with pins 82. A forward chip 831 and a rear chip 832 make up sensing chips 83 wire-bonded to the ceramic substrate 84. The wire-bonded portion is coated with a heat resistant material. A ceramic substrate support 85 is adapted to fix the ceramic substrate 84 diagonally at a predetermined sharp angle to the flow. The support 85 is made of such a material as resin or ceramics, which may alternatively be a metal if the pins 82 are insulated. A cover housing 86 is made of a metal which is projection-welded or bonded with a heat-resistant resin to the substrate 81.

Figure 11:
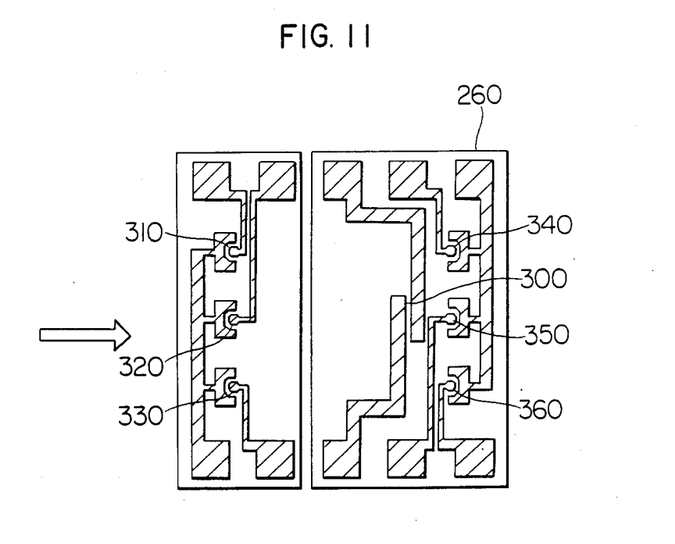
FIG. 11 is a plan view showing a semiconductor chip of a fifth embodiment.

In FIG. 11 showing a fifth embodiment, a semiconductor chip 260 includes a diffusion resistor making up a heater 300, an upstream temperature detector for detecting the fluid temperature upstream of the heater 300, and a downstream temperature detector for detecting the fluid temperature downstream of the heater 300.

The upstream temperature detector includes three diodes (equivalent to transistors) 310, 320, 330, and is formed somewhat distant from the heater 300. The downstream temperature detector, which includes three diodes 340, 350 and 360, on the other hand, is formed at a position proximate the heater 300. The hatched portion indicates an electrode formed by aluminum evaporation.

Figure 12:
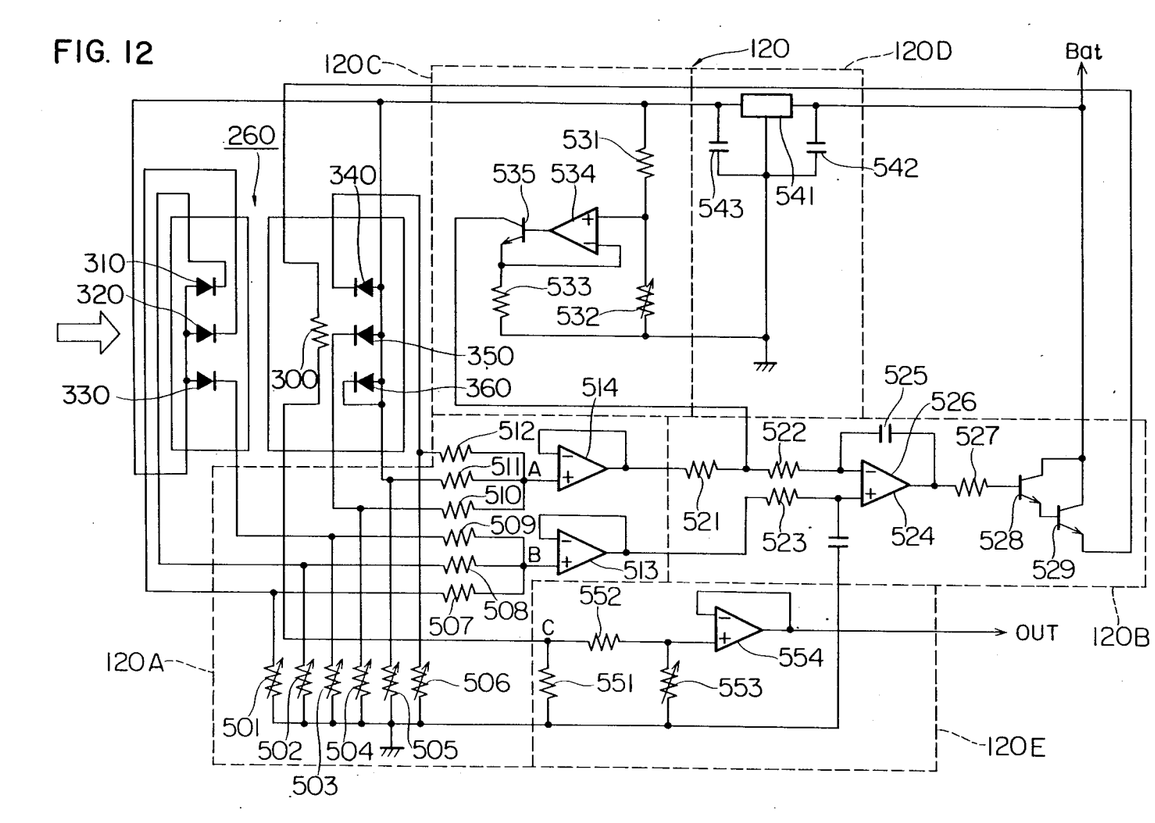
FIG. 12 is a diagram showing an electrical circuit used in the apparatus of FIG. 11.

The circuit section 120 used in the fifth embodiment will be explained in detail with reference to FIG. 12. The circuit section 120 is for processing the detection signal of the sensor 11 to produce an output signal representing the flow rate, and includes a temperature output processing section 120A, a feedback control section 120B, an offset control section 120C, a power supply 120D and an output section 120E.

The processing section 120A is a circuit for producing a voltage between the anode and cathode of the diodes 310 to 360 supplied with a constant voltage, and includes resistors 501 to 512 connected to the diodes respectively and operational amplifiers 513 and 514. The resistors 507 to 509 are for producing an average value of the voltage between the anode and cathode of the diodes 310 to 330 on the upstream side, and the resistors 510 to 512 are for producing an average value of the voltage between anode and cathode of the diodes 340 to 360 on the downstream side, both groups of resistors having a resistance value larger than the resistors 501 to 506 by one digit. It is assumed that the variations of the temperature coefficient are not compensated for and follow the normal distribution curve. Then, such variations are one third on both upstream and downstream sides. Further, in order to reduce the error, the resistors 501 to 506 may be made up of variable resistors. The operational amplifiers 513 and 514 are such that the average value of the voltage between anode and cathode of the diodes on upstream and downstream sides is subjected to impedance conversion and is applied to the feedback control section 120B.

The feedback control section 120B is for changing the voltage applied to the heater 300C to control the power consumption of the heater 300 in such a manner that the temperature difference between upstream and downstream sides becomes equal to the voltage difference set at the offset control section 120C. In this circuit, numerals 521, 522 and 523 designate resistors, numerals 524, 525 capacitors, and numeral 526 an operational amplifier. An output signal is produced at a time constant determined by the resistors 522, 523 and the capacitors 524, 525 to power-amplify the signal by the transistors 528, 529 connected in Darlington pair through the resistor 527.

The offset control section 120C operates in such a way that in order for the voltage determined by the resistors 531, 532 is equal to the potential difference of the resistor 533, the voltage is controlled by the operational amplifier 534 and the transistor 535. The power supply section 120D includes a regulator 541 and capacitors 542, 543 to produce a constant voltage. The output section 120E is for producing the power consumed by the heater 300 in the form of flow rate signal of the detector, and includes a low-value resistor 551 and resistors 552, 553 higher in resistance than the resistor 551, and an operational amplifier 554 for adjusting the gain of the output by the divided resistance value of the resistors 552 and 553.

In this configuration, when power is consumed by the heater 300 of the semiconductor chip 260, the heat is transmitted to the fluid flowing along the path in the casing.

The temperature of the fluid upstream of the heater 300 is detected by three adjacently located diodes 310 to 330, and therefore not a local fluid temperature but an average value of the fluid temperature over a wide range is detected.

The fluid temperature downstream of the heater 300 is detected in similar fashion by three diodes 340 to 360 to produce an average fluid temperature. Since the downstream fluid is heated by the heater 300, accumrate detection of the temperature thereof is necessary even when the flow is turbulent. According to the present invention, the arrangement of a plurality of adjacent diodes permits stable temperature detection as the flow, if turbulent, passes above the diodes without fail.

The temperature detectors and the heater, which are solid and not made of wire, have no problem of breakage, and can be fabricated by the ordinary semiconductor fabrication techniques, so that they can be finely processed, resulting in the reduction in size and heat capacity of these parts for an improved response.

The amount of heat of the heater 300 is controlled by the circuit section 120 in such a way that the potential difference between points A and B detected by the diodes becomes equal to the offset voltage, thereby controlling the temperature difference between the diodes 310 to 330 and the diodes 340 to 360 to a predetermined value. As a result, the electric power consumed at the heater 300 maintains a predetermined functional relation with the flow rate and increases along a certain curve with the flow rate. The power consumption of the heater 300 is produced as a voltage at point C, on the other hand, and therefore, a signal associated with the flow rate is produced from the terminal OUT.

Figure 13:
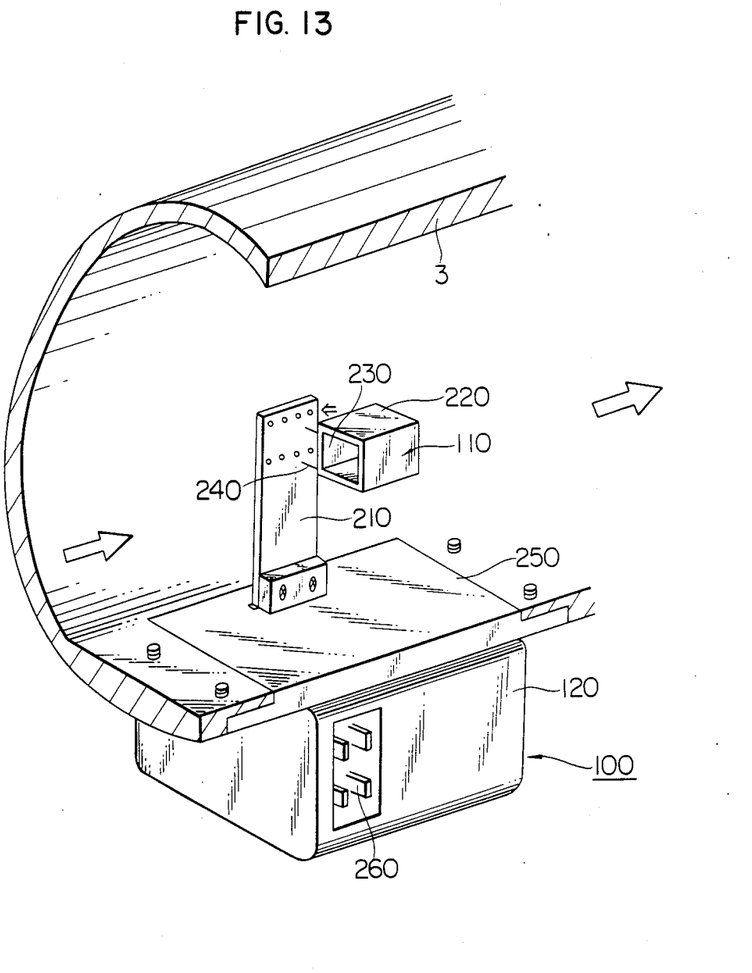
FIG. 13 is a sectional perspective view showing a 6th embodiment of the apparatus shown in FIG. 1.

A sixth embodiment with a detector 100 mounted on the intake pipe 2 will be explained with reference to FIG. 13. A semiconductor-type flow rate detecting apparatus 1 comprising a sensor 110 and a circuit section 120 is screwed to an intake pipe 3.

The sensor 110 includes a casing 220 and a casing support 210 made of ceramics or synthetic resin. The casing 220, which is formed with a fluid path 230, is supported on a support 210 in such a way that the path 230 is located in parallel to the flow at the central part in the intake pipe 3 where the flow velocity is highest.

The sensor 110 is of dual in-line package type with a pair of rows of pins 240, and is bonded and secured by being inserted into the holes of the substrate 210 after evaluation and selection with IC tester or the like. The support 210 has an insulating plate with a wiring printed thereon for transmitting a signal from the sensor 110 to the circuit section 120. Numeral 250 designates a plate making up a part of the housing of the circuit section 120 and used to mount the housing on the intake pipe 3, which plate 250 is partly protruded into the intake pipe 3 to provide means for securing the support 210.

The circuit section 120 processes the output signal of the semiconductor chips and produces a signal representing the flow rate from the connector 260.

Figure 14:
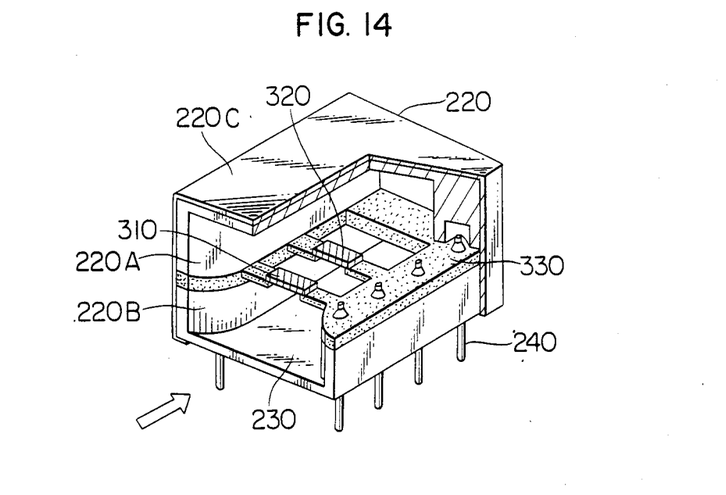
FIG. 14 is a partly cut-away sectional perspective view showing a 7th embodiment of a sensor shown in FIG. 13.

In FIG. 14 showing the construction of the sensor 110, numeral 310 designates a first semiconductor chip arranged upstream and made of a silicon substrate formed with a temperature sensor thereon, and numeral 320 a second semiconductor chip arranged downstream in proximity to the first semiconductor chip 310 and made of a silicon substrate formed with a heater and a temperature detector thereon.

Numeral 330 designates a ceramic substrate, in which a conductor paste is baked by printing to electrically connect a lead pins 240 and the chips 310, 320 to each other, and after the chips 310 and 320 are fixed by the flip chip bump process, the ceramic substrate 330 is secured to the pins 240 fixed on the casing 220B by soldering.

The casing 220 includes a first casing part 220A, a second casing part 220B and a cover 230 of stainless steel. The ceramic substrate 330 is fixedly sandwiched between the casing parts 220A and 220B.

The casing part 220B is integrally formed with the pins 240 with such resin as PPS, or molded with ceramics and secured with the pins 240, or of hermetic type. The casing part 220A, which is made of a material similar to the casing 220a, is fixed on the substrate 330 by bonding agent.

The fluid inlet of the casing 220 is bellmouthshaped to permit the fluid to flow into the path 230 without any disturbance.

Figure 15:
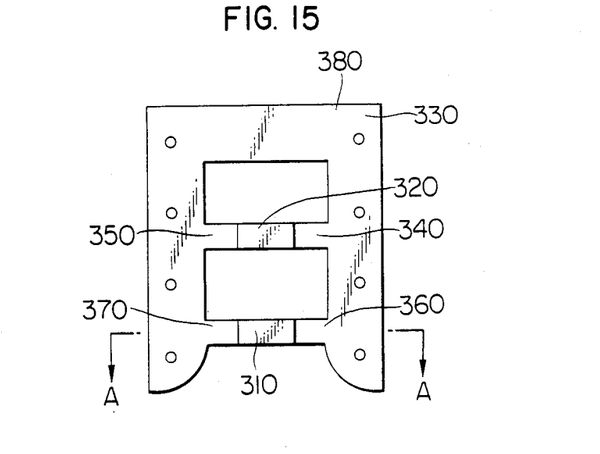
FIG. 15 and FIG. 16 are a plan view and a sectional view of a ceramic substrate respectively according to an 8th embodiment.
Figure 16:
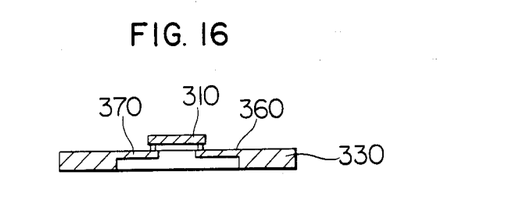

FIGS. 15 and 16 show semiconductor chips 310, 320 and ceramic substrate 330 alone. Four supports 340, 350, 360, 370 protruded in ramification are formed in a cut-out portion of the channel-shaped substrate 330, the supports being thinner than the channel-shaped peripheral portion 380. This structure, as compared with the construction of the same thickness over the whole substrate, is higher in strength and therefore easy to handle. In addition, the amount of heat transmitted from the heater of the second semiconductor chip 320 to the ceramic substrate and the amount of heat transmitted from the ceramic substrate to the fluid are reduced, thereby decreasing the heat capacity.

The peripheral portion 380 of the substrate 330 preferably has a thickness of 0.6 to 0.8 mm to provide a sufficient strength required for assembly and to facilitate the preparation of a sheet. The thickness of the supports 340 to 370, on the other hand, is preferably 0.1 to 0.2 mm which prevents the supports from being broken by vibrations on the one hand and prevents the force of displacement of the protrusions from being applied to the flip chip bumps on the other hand.

Figure 17:
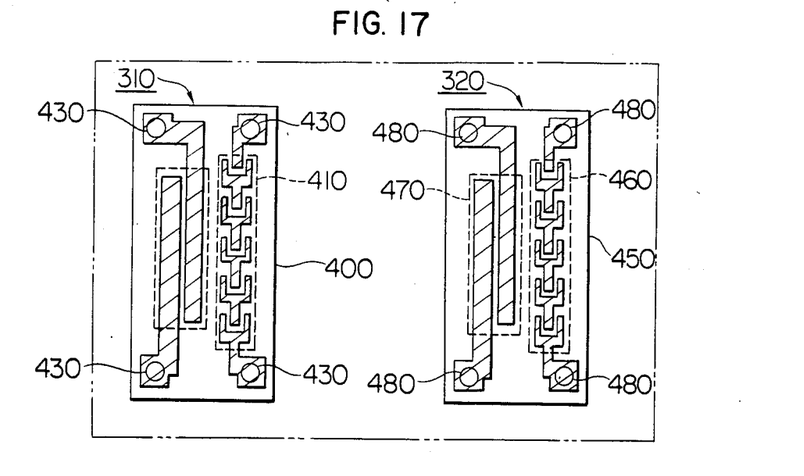
FIG. 17 is a plan view of a semiconductor chip according to a 9th embodiment.

Now, the construction of the semiconductor chips 310, 320 will be explained.

The semiconductor chip 310 may be comprised of a diode alone. Nevertheless, according to the embodiment under consideration, semiconductor chips of the same pattern are arranged both upstream and downstream as shown in FIG. 17 to attain the simplicity. In the drawing, hatched portions represent aluminum electrodes, in which numeral 410 designates a first temperature detector, numeral 460 a second temperature detector, and numeral 470 a heater made of a diffusion resistor. The temperature detectors 410 and 460 each include five diodes in series formed with an aluminum electrode deposited by evaporation after diffusion of P-type impurities and N-type impurities in the silicon substrates 400 and 450 respectively to attain a higher sensitivity to heat at 10 to 12.5 mV/°C.

Numerals 430 and 480 designate flip chip bumps which are bulged by solder to provide means for fixing by contact with the ceramic substrate 330 at four points. The method of fixing a chip by the flip chip bump process uses four contact points, and therefore the heat capacity of the chips is reduced as compared with the alloy method generally used with semiconductors.

In this configuration, when power is consumed by the heater 470 of the second semiconductor chip 320 on the downstream side, the heat is transmitted to the fluid flowing in the path of the casing 220 on the one hand and to the silicon substrate of the second semiconductor chip 320 and the ceramic substrate 330 on the other hand.

Although the silicon substrate high in heat conductivity is stabilized in a short time, it takes a long time until the heat transmitted to the ceramic substrate 230 low in heat conductivity is eliminated to reach a steady state, thereby deteriorating the response. According to the embodiment under consideration, however, the thickness of the portions ramified to fix the chips is reduced so that the volume of the portion affecting the response is smaller, thereby helping to attain a steady state in a short time.

Figure 18:
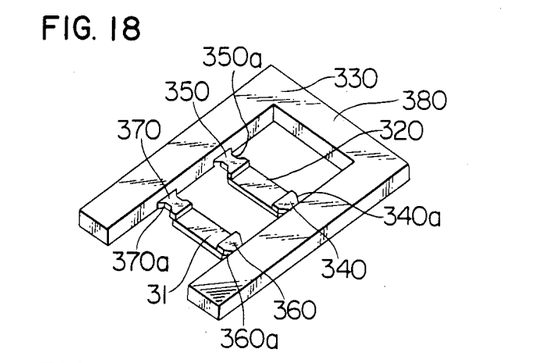
FIG. 18 is a perspective view of the 9th embodiment of the present invention.

Now, a ninth embodiment of the present invention will be described with reference to FIG. 18. In the ninth embodiment, thin portions 340 to 370 protruded in ramification include intermediate narrow portions 340a to 370a to improve the heat insulating efficiency, thus improving the responsiveness.

Figure 19:
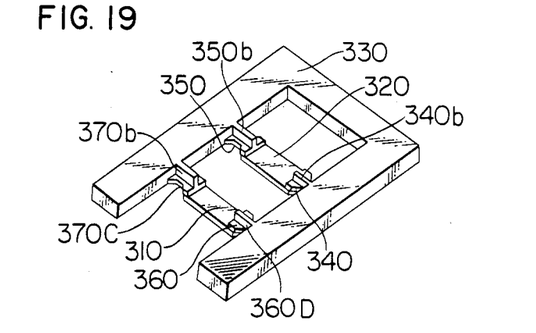
FIG. 19 is a front view of a 10th embodiment of the present invention.

FIG. 19 is a diagram for explaining a tenth embodiment of the present invention, in which protruded portions 340 to 370 of the ceramic substrate 230 are provided with ribs 340b to 370b. This construction permits the plate thickness to be further reduced while at the same time increasing the resistance to vibrations and reducing the amount of heat transmitted to the ceramic substrate.

We claim:

1. A semiconductor-type apparatus for detecting a fluid flow rate comprising:
    a casing having a communicated portion arranged in a flow path of the fluid;
    at least one insulating base provided in said casing and having a cut-out portion formed at the communicated portion of said casing;
    a first rectangular thin plate semiconductor chip having its long sides sufficiently longer than its short sides and arranged in said cut-out portion supported by said insulating base at both short sides so that the long sides are perpendicular to a direction of fluid flow and both surfaces of said first semiconductor chip are substantially in parallel with the direction of fluid flow and having a first temperature detecting element formed on the surface of said first semiconductor chip having a maximum area so that the surface having said first temperature detecting element is parallel with the direction of fluid flow, and both surfaces of said first semiconductor chip are exposed to the fluid flow; and
    a second rectangular thin plate semiconductor chip having its long sides sufficiently longer than its short sides, positioned in proximity to said first semiconductor chip and arranged in said cut-out portion supported by said insulating base at both short sides of said second semiconductor chip so that the long sides thereof are perpendicular to the direction of fluid flow and both surfaces of said second semiconductor chip are substantially parallel with the direction of fluid flow and having a heater element and a second temperature detecting element formed on the surface of said second semiconductor chip having a maximum area so that said heater element is formed at substantially the center with respect to the long sides of said second semiconductor chip and so that the surface on which said heater element and said second temperature detecting element are formed is also parallel with the direction of fluid flow, and both surfaces of said second semiconductor chip are exposed to the fluid flow.

2. A flow rate detecting apparatus according to claim 1 wherein said first temperature detecting element includes a plurality of diodes connected in series with each other.

3. A flow rate detecting apparatus according to claim 1 wherein said second temperature detecting element includes a plurality of diodes connected in series with each other.

4. A flow rate detecting apparatus according to claim 1 wherein said cut-out portion of said insulating base is formed along the direction of flow of fluid.

5. An apparatus according to claim 4 further comprising a projection formed on said insulating base and projecting from said insulating base to said cut-out portion, said first and second semiconductor chips being provided on said projection.

6. An apparatus according to claim 5 wherein said projection has a thickness less than that of said insulating base.

7. An apparatus according to claim 6 wherein said projection has a supporting rib.

8. An apparatus according to claim 1 further including a socket projected to said flow path and wherein said casing is fixedly inserted into said socket.

9. A flow rate detecting apparatus according to claim 1 further comprising:
    control means, coupled to said first and second temperature detecting elements and to said heater, for controlling the amount of heat generated by the heater element so as to maintain constant the difference between the temperature detected by the first temperature detecting element of said first semiconductor chip and the temperature detected by the second temperature detecting element of said second semiconductor chip.

10. A flow rate detecting apparatus according to claim 9 wherein said controlling means comprise a processing circuit arranged on said insulating base for processing a signal produced from said first and second semiconductor chips.

11. A flow rate detecting apparatus according to claim 1 wherein said at least one insulating base is disposed in said casing in parallel with the direction of fluid flow.

12. A flow rate detecting apparatus according to claim 1 wherein said cut-out portion is formed in said insulating base having an opening of said cut-out portion at the upstream side of said insulating base.

13. A semiconductor-type apparatus for detecting a fluid flow rate comprising:
    a casing having a passage along the longitudinal axis thereof and disposed in a flow path of the fluid;
    an insulator base plate provided in the passage of said casing in parallel with a direction of flow of the fluid through the passage, said insulator base plate having a cut-out portion formed therein such that an opening of the cut-out portion is located at the upstream end of said insulator base plate, said insulator base plate including a first pair and a second pair of supports, each pair of supports having the supports protruding respectively from both sides of said cut-out portion towards the longitudinal axis of the passage to oppose to each other so that said first pair and second pair of supports are arranged in proximity to each other and along the direction of flow of the fluid;

a first rectangular thin plate semiconductor chip having its long sides sufficiently longer than its short sides and having a first temperature detecting element formed on a surface having a moximum area and attached at its opposite short sides to said first pair of protruding supports so that said first semiconductor chip bridges a gap between the opposed protruding supports and is exposed on both surfaces thereof to the fluid flow and that the long sides of said first semiconductor chip are perpendicular to the direction of fluid flow and the surface on which said first temperature detecting element is formed is parallel with the direction of fluid flow; and a second rectangular thin plate semiconductor chip having its long sides sufficiently longer than its short sides and having a heater element and a second temperature detecting element formed on a surface having a maximum area so that said heater element is formed at substantially the center with respect to the long sides of said second semiconductor chip and attached at its opposite short sides to said second pair of protruding supports to bridge a gap between the opposed protruding supports and is exposed on both surface thereof to the fluid flow and that the long sides of said second semiconductor chip are perpendicular to the direction of fluid flow and the surface on which said heater element and said second temperature detecting element are formed is in parallel with the direction of fluid flow.

14. A flow rate detecting apparatus according to claim 13, wherein the both sides of the cut-out portion of said insulator base plate are registered with opposing inner surfaces of the passage of said casing so that substantially only the protruding supports of said insulator base plate are disposed within the passage of said casing.

15. A flow rate detecting apparatus according to claim 13, wherein said second pair of supports constitute only paths for the heat generated in the heater of said second semiconductor chip conducted to said insulator base plate thereby to minimize the heat lost to said insulator base plate and the heat conducted to the fluid from said insulator base plate.

* * * * *